Fig.-2

May 5, 1936.  A. L. HESTON  2,039,532

TIRE BUILDING APPARATUS

Filed Dec. 7, 1933  8 Sheets-Sheet 3

INVENTOR
ALLEN L. HESTON
BY Barrow
ATTORNEYS

May 5, 1936.  A. L. HESTON  2,039,532
TIRE BUILDING APPARATUS
Filed Dec. 7, 1933  8 Sheets-Sheet 5

May 5, 1936.  A. L. HESTON  2,039,532
TIRE BUILDING APPARATUS
Filed Dec. 7, 1933   8 Sheets-Sheet 7

Fig. 8

INVENTOR
ALLEN L. HESTON
BY Barrow
ATTORNEYS

Patented May 5, 1936

2,039,532

UNITED STATES PATENT OFFICE 2,039,532

TIRE BUILDING APPARATUS

Allen L. Heston, Akron, Ohio, assignor to National Rubber Machinery Company, Akron, Ohio, a corporation of Ohio Application December 7, 1933, Serial No. 701,255

36 Claims. (Cl. 154—10)

This invention relates to tire building apparatus, and more especially it relates to apparatus for storing a plurality of lengths of tire building fabric of different widths in proximity to a tire building machine so as to be withdrawn by the latter during the manufacture of pneumatic tire casings.

The chief objects of the invention are to provide improved apparatus for the storage of tire building fabric adjacent a tire building machine; to avoid stretching of the tire building fabric during the infeed and outfeed thereof, and during the period that it remains in the apparatus; to provide power operated outfeed for the fabric strips, which power is obtained from the building form of the tire building machine; to provide means whereby outfeed of the fabric is effected notwithstanding different directions of rotation of the building form; to provide facilities for storing the tire building fabric in a liner; to provide for maintaining tension on the liner as the fabric is wrapped therein, thus assuring smooth wrapping without folds or creases; to provide improved means for rewinding a liner as stock is withdrawn from the apparatus; to provide self-contained and automatically operating liner rewinding mechanism; and to conserve floor space. Other objects will be manifest as the specification proceeds.

Of the accompanying drawings,—

Referring to the drawings, 15 is a pedestal support or standard upon the top of which is pivotally mounted a turntable or turret 16. The latter may be of any suitable size and shape to serve the end desired. The turret carries a plurality of stock rolls of tire building material, preferably of various widths and bias angles sufficient for the building of a complete pneumatic tire casing. The turret 16 as shown has four sides although obviously it may have more or less than that number. Indexing mechanism (not shown) of any known or desired arrangement is provided for turning the turret angularly a determinate distance as desired. When stationary, one side of the turret is at a work receiving station A (Figure 1), there being apparatus having a fixed situs thereat for cooperating with the mechanism carried by the turret to feed strip material into a stock roll carried by the turret to replenish the stock that has been withdrawn therefrom at a work delivery station B disposed at another side of the turret. At the work delivery station B is mechanism that has a fixed situs thereat and cooperates with the mechanism carried by the turret to withdraw strip material from a stock roll on the turret, and guides and supports said strip to an adjacent rotatable tire building form or drum D. It utilizes the rotary movement of the latter to facilitate removal of the strip from its stock roll.

The mechanisms which support the stock rolls on the respective sides of the turret are identical in structure so that a description of one of them will suffice.

Rising from opposite ends of each side of the turret are respective bracket arms 18, 18 that have their upper end portions curved outwardly to goose-neck form, and a rock-shaft 19 is journaled at its respective ends in the upper ends of said bracket arms. Secured to said rock-shaft 19 and extending downwardly therefrom is a pair of pendulous arms 20, 20, which arms are connected somewhat below their middle by a tie rod or shaft 21 upon which is journaled a hollow shell or supply roller 22 upon which is carried a relatively long length of rubberized tire building fabric 23 interwound with a liner 24. At their lower ends the arms 20 are connected by a tie rod or shaft 25 upon which is journaled a roller 26 about which the outer convolution of fabric 23 and liner 24 extends, the arrangement being such as to create a bight 27 in said convolution.

Carried by the arms 20, somewhat above the supply roller 22 is a liner supply and rewind roller 29 to which one end of the liner 24 is attached, the other end of said liner being attached to roller 22. The length of said liner is such that it can be interwound with tire building fabric 23 of sufficient length to provide plies for several tires.

Figures 5, 6:
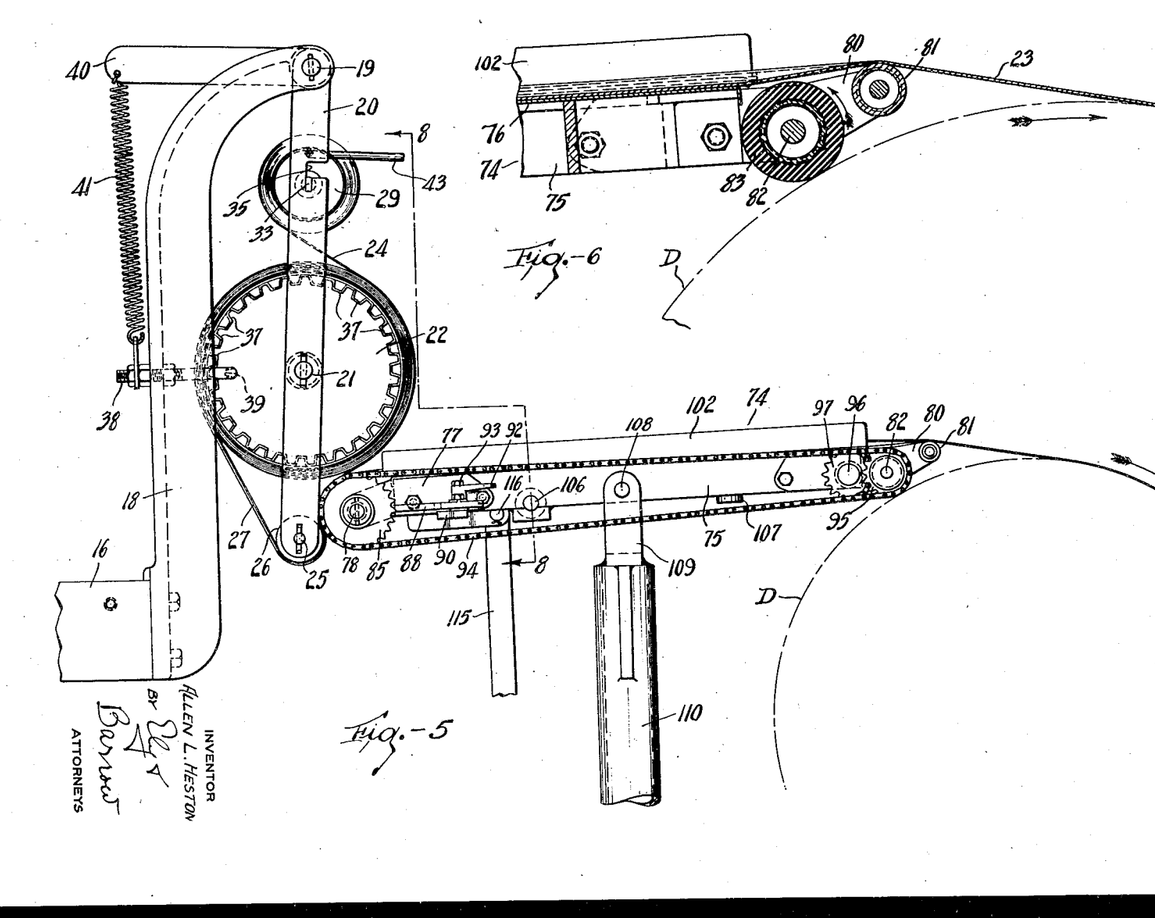
Figure 5 is a detail side elevation, on a larger scale, of the work delivery end of the apparatus.
Figure 6 is a section on the line 6—6 of Figure 4.
Figure 7:
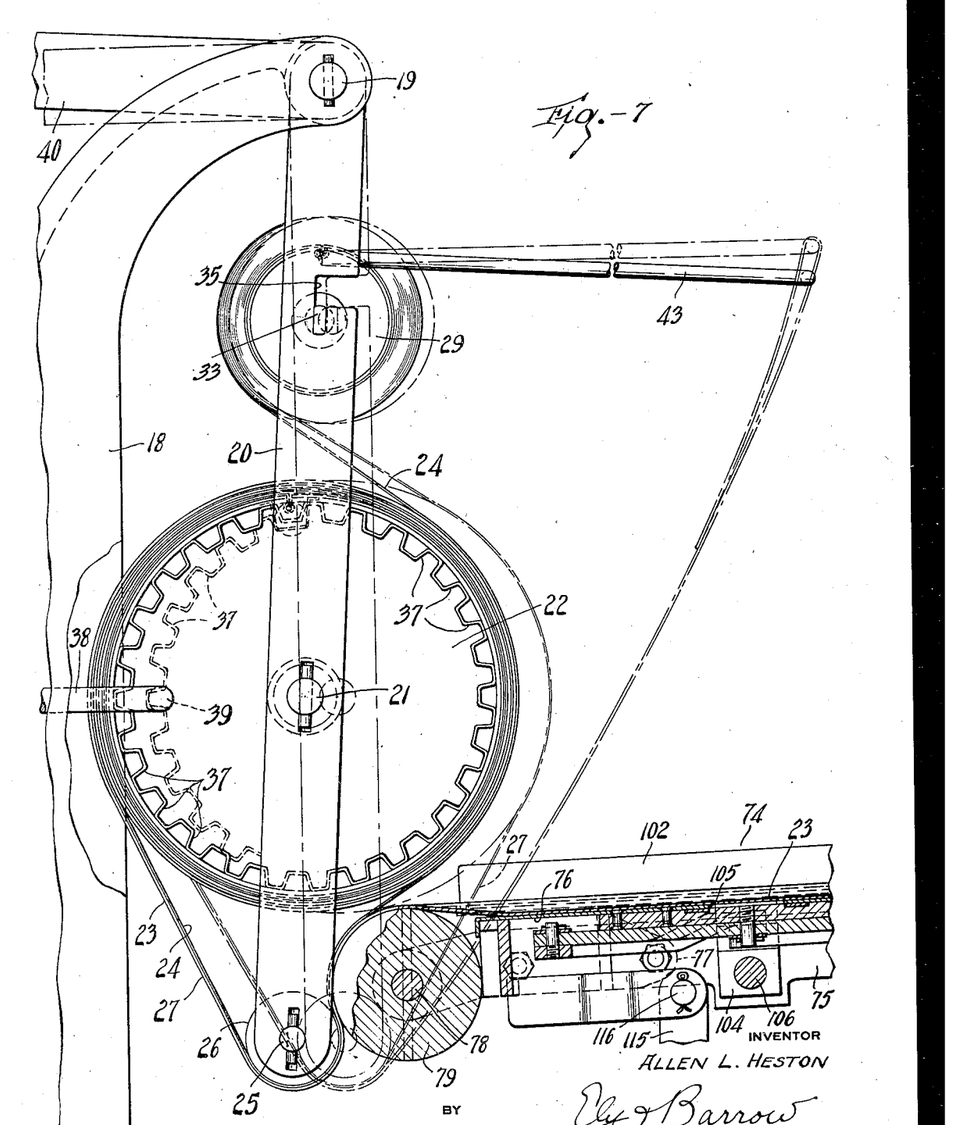
Figure 7 is a section substantially on the line 7—7 of Figure 4, on a larger scale.
Figure 8:
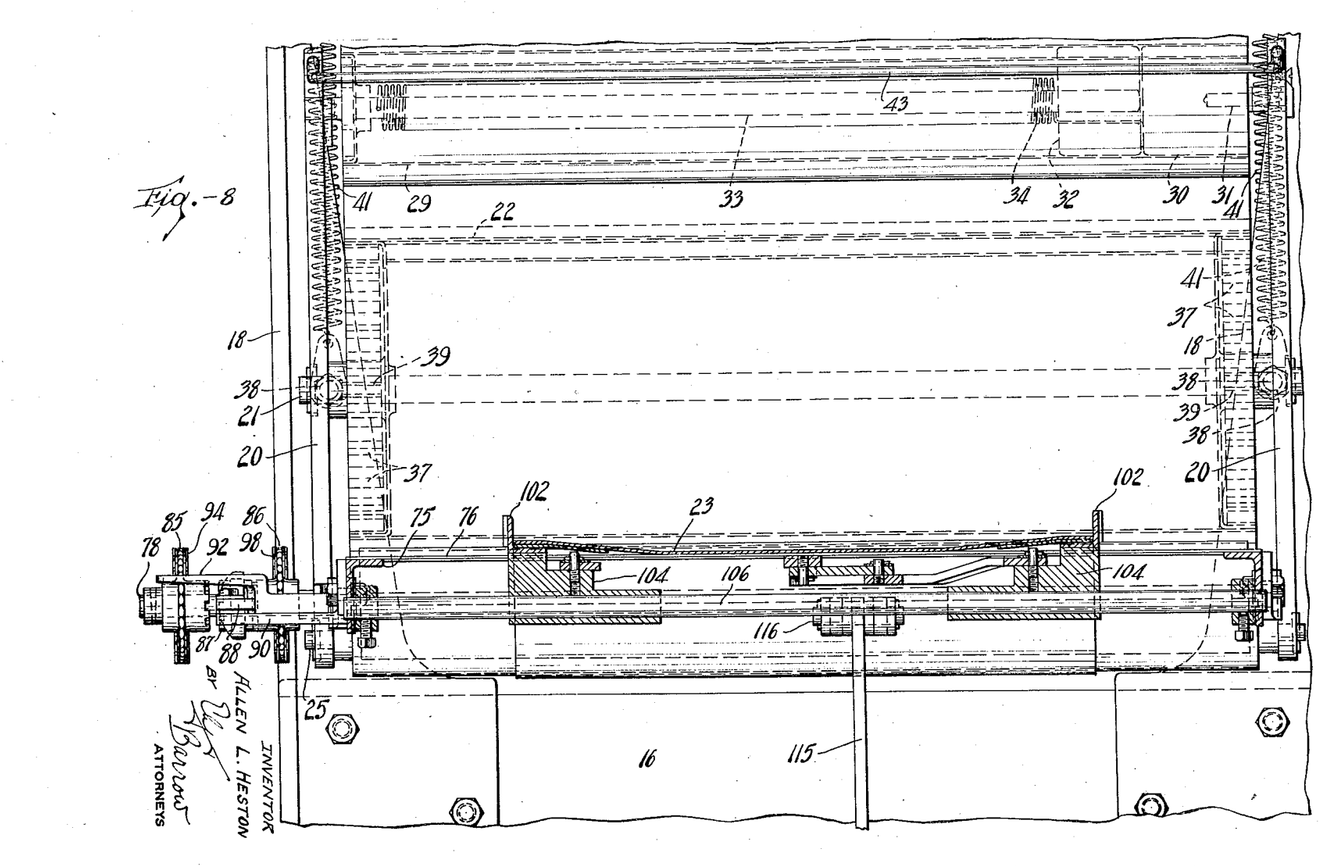
Figure 8 is a section on the line 8—8 of Figure 5, on a larger scale.

As is most clearly shown in Figure 8, the liner rewind roller 29 comprises an outer shell having a plug 30 in one end, there being a stud 31 projecting from said plugged end, which stud is journaled in a suitable aperture formed in the adjacent arm 20. A metal plug 32 fixed in the roller shell behind the plug 30 is formed with a bearing for an axial shaft 33 that projects from the opposite end of the shell. A torsion spring 34 is mounted upon said shaft, and has one of its ends connected thereto and its other end attached to the plug 32. The projecting outer end of shaft 33 has its opposite sides flattened as shown in Figures 5 and 7, and is engaged in a slot 35 in the adjacent arm 20, said slot being of such shape as to preclude rotation of said shaft. The arrangement is such that when liner 24 is drawn from the roller 29 onto the supply roller 22, to be interwound with fabric strip 23 during a work-receiving operation, the roller 29 is rotated relatively of its shaft 33 in a direction such that it tightens the torsion spring 34 and thus stores up energy therein. This latent energy is utilized for keeping the liner taut at all times, and for rewinding the liner onto the roller 29 when the fabric 23 subsequently is withdrawn from the supply roll and fed onto the tire building form D.

In order to prevent the spring 34 from causing rotary movement of the supply roll at other times, the respective ends of the roller shell 22 are recessed as shown in Figure 8, and provided interiorly with respective circumferential series of teeth 37, 37. Mounted in each bracket arm 18 and projecting outwardly therefrom is a stud 38 having its free end so bent as to constitute a dog 39 that is so disposed as to engage between teeth 37 of shell 22 when the pendulous arms 20 are substantially in vertical position, which may be considered the normal inoperative position of the supply rolls. This position of the said arms is indicated in broken lines in Figure 7. The arms 20 are yieldingly urged to vertical position by means of lever arms 40, 40 that are secured to the rock shaft 19 and extend rearwardly therefrom, the free ends of said lever arms being connected to respective tension springs 41, the other ends of the latter being connected to the projecting rear ends of the studs 38.

The arms 20 also carry a rod 43 arranged as a forwardly extending bracket upon which the outermost end of the fabric strip 23 conveniently may be supported when the supply roll is in inoperative position.

Figure 1:
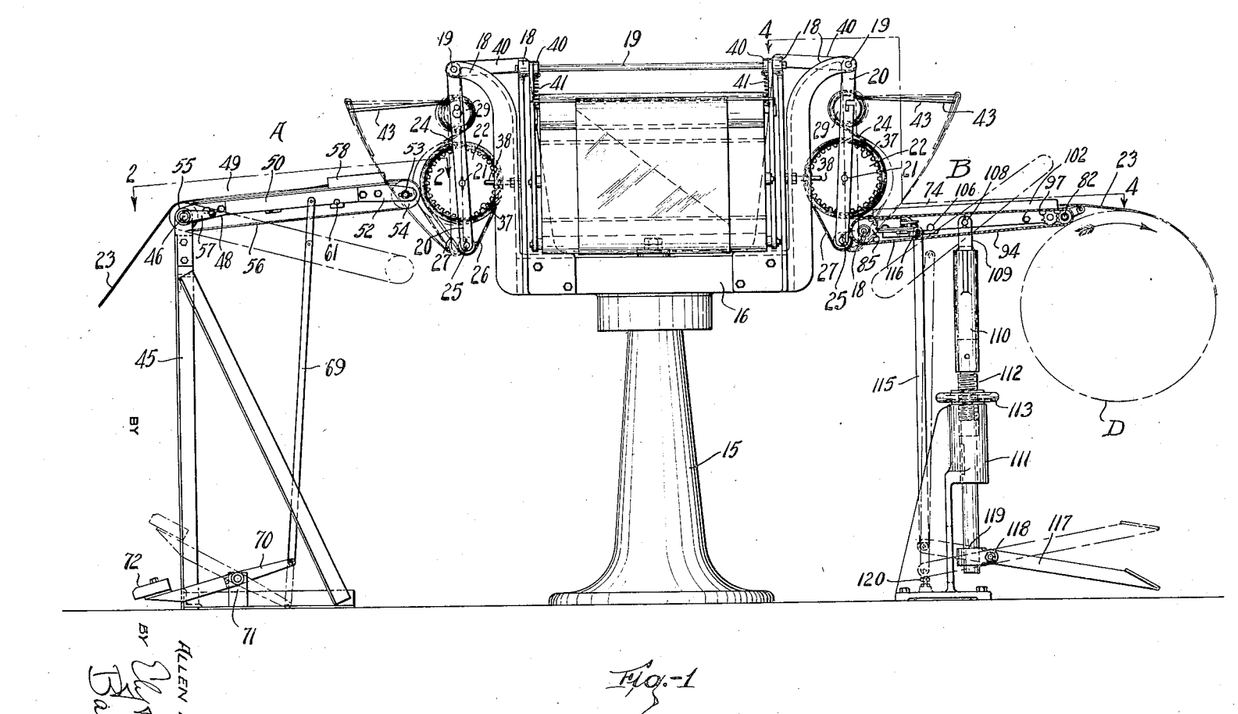
Figure 1 is a side elevation of apparatus embodying the invention, in its preferred form, in operative position.
Figure 2:
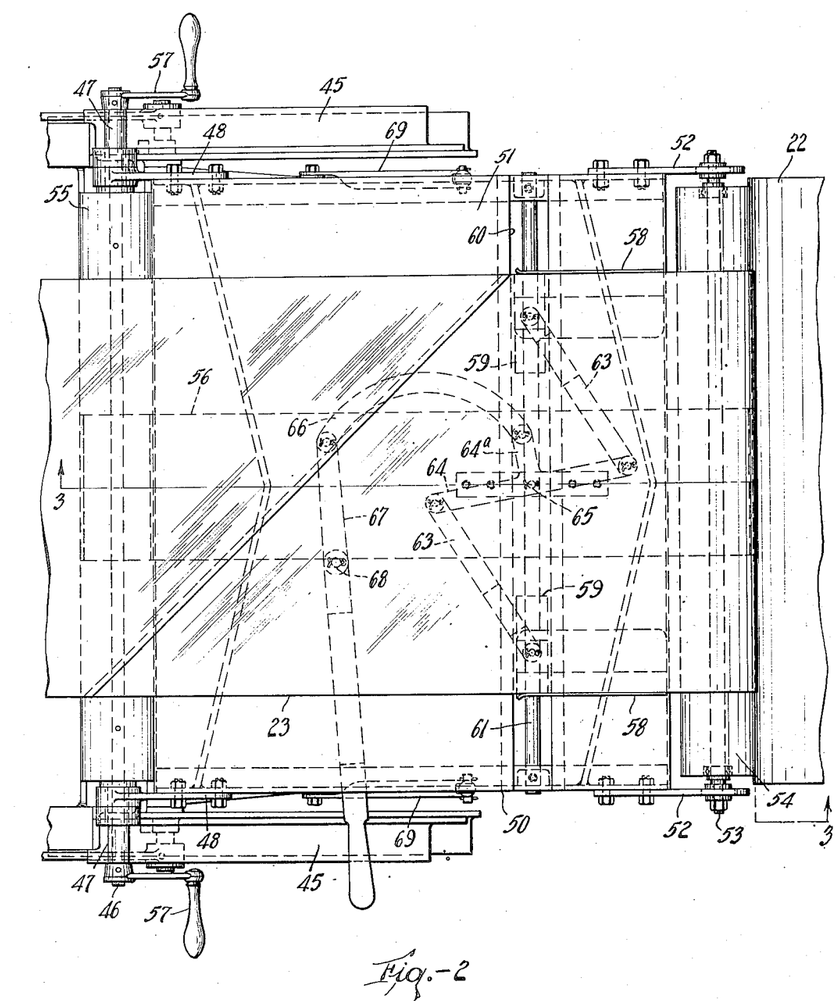
Figure 2 is a plan view of the work receiving end of the apparatus, on a larger scale, as indicated by the line 2—2 of Figure 1.
Figure 3:
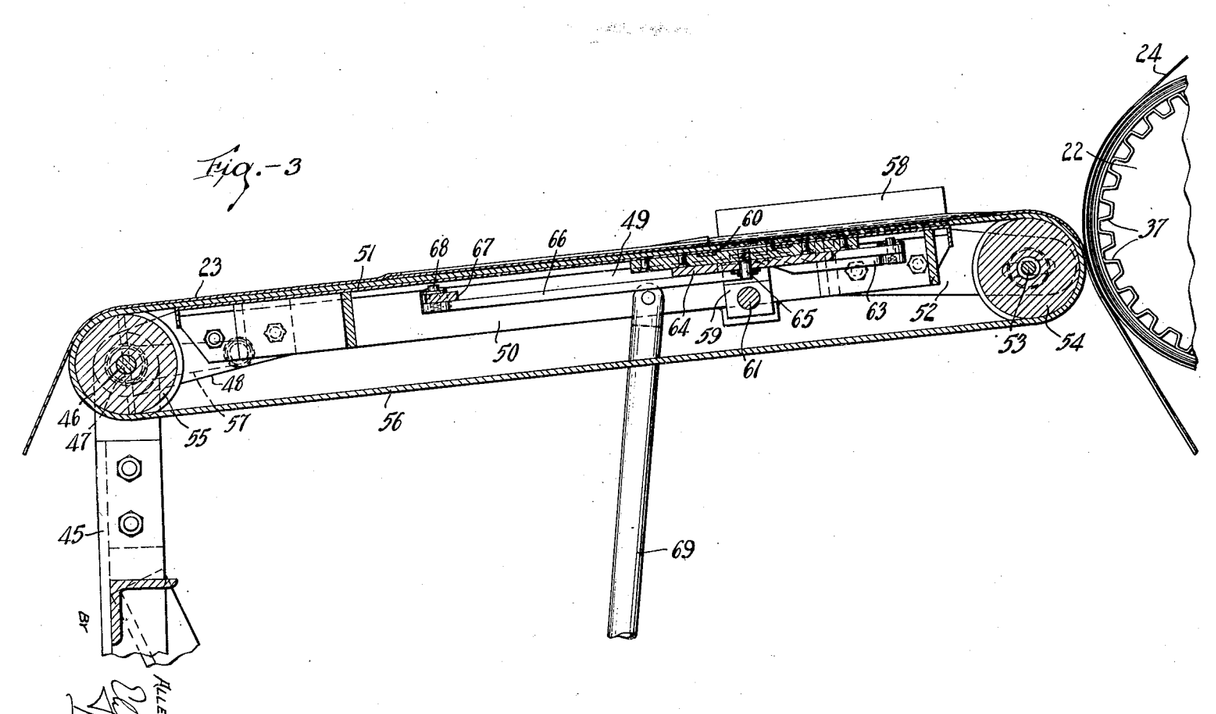
Figure 3 is a section on the line 3—3 of Figure 2.

At the work-receiving station A is apparatus for feeding tire fabric 23 onto the supply roller 22, said apparatus being best shown in Figures 1, 2 and 3. Said apparatus comprises a suitably braced, upright framework 45, at the top of which is a rotatable shaft 46 that is journaled in elongate bearing bushings 47, 47 carried by said framework at opposite sides thereof. Journaled on said bushings 47 are respective short arms 48 that carry between them a tray 49 comprising a rectangular metal frame 50 having a thin sheet metal top 51. A pair of arms 52, 52 are mounted on opposite sides of the frame 50 at the free end thereof and extend toward the turret 16, said arms carrying a shaft 53 that is adjustably mounted therein. A roller 54 is journaled on shaft 53, and a similar roller 55 is mounted upon shaft 46 at the opposite end of the tray. The rollers 54, 55 are centrally waisted or recessed to receive a relatively narrow endless belt 56, the upper reach of which rests upon the metal top 51. The opposite ends of the shaft 46 are provided with respective hand cranks 57 whereby the roller 55 may be rotated from either end by either hand of the operator. Rotation of roller 55 effects rotation of roller 54 through the agency of belt 56, for the purpose of feeding a strip of fabric 23 onto supply roller 22 as presently will be explained.

For guiding the fabric strip 23 accurately across tray 49, the top of the latter is provided with a pair of upstanding guides 58, 58 for engaging the lateral margins of said fabric strip. The guides 58 are mounted upon respective supporting blocks 59, 59 that extend through a slot 60 in the tray top 51, which slot extends transversely of the tray. Below the tray top 51 the blocks 59 are slidably mounted on a guide rod 61 extending transversely of the tray below slot 60.

For adjusting the guides 58 laterally so as to engage fabric strips of various widths, respective links 63 are connected at one end to the respective blocks 59, and at their other ends are connected to the opposite ends of a lever 64 that is pivotally mounted at its middle at 65 on the under side of the tray. The lever 64 is provided at its middle with a lateral projection 64ᵃ to which is connected one end of an arcuate link 66, the other end of said link being connected to one end of a hand lever 67 that is pivotally mounted at 68 on the under side of the tray. The hand lever 67 extends beyond the lateral margin of the tray so as to be conveniently grasped for manual operation. There is sufficient friction in the parts described to prevent the guides 58 from shifting under the pressure of the fabric strip 23 so that no other locking means is required for the guides. The arrangement makes for rapid and easy adjustment of the guides.

The tray 49 is arranged to be oscillated or tilted about the bushings 47 as a pivot so that it may assume alternatively the respective positions shown in full lines and in broken lines in Figure 1. To this end push rods 69, 69 are connected at their upper ends to opposite sides of the tray frame 50, and at their lower ends are connected to the adjacent ends of respective lever arms 70, 70, the latter being pivotally mounted at their middle on a floor bracket 71 and having their opposite ends connected by a tread board 72. The lever arms thus constitute a foot-treadle by which the free end of tray 49 may be manually raised and lowered.

The supply roll 22 that is at the work receiving station A, in its normal inoperative position, that is, with the pendulous arms in vertical position, is positioned in the orbit of roller 54 of tray 49 when the latter is oscillated. Thus when the free end of said tray is lifted to operative position, as shown in Figures 1 and 3, the roller 54 engages the supply roll 22 in such a manner as to move it rearwardly, against the tension of the springs 41, whereby the teeth 37 of shell 22 are moved out of engagement with the dogs 39 and the supply roll is free to be rotated. Turning of either hand crank 57, which drives rollers 54 and 55, will rotate supply roll 22. Thus a length of fabric 23, spliced to the trailing end of the fabric strip already on said supply roll, may be fed across the tray and onto the latter, the rotation of the supply roll drawing the liner 24 from the liner rewind roller 29 and interwinding it with the fabric strip 23. When the tray 49 is lowered to inoperative position, the springs 41 restore the supply roll 22 to inoperative position, the dogs 39 engaging the teeth 37 to prevent reverse rotation of the supply roll due to pull on the liner caused by the spring 34 in the liner rewind roller 29.

Figure 9:
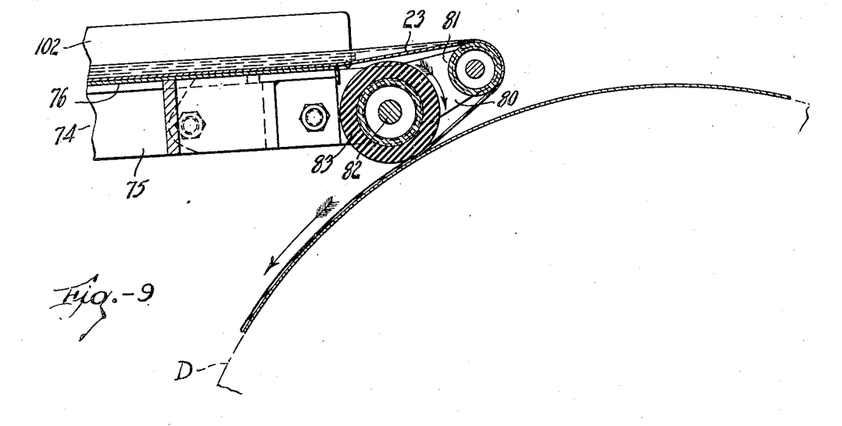
Figure 9 is a section similar to Figure 6 showing how the tire building fabric passes onto the tire building form when the latter is rotating in reverse direction.

At the work delivery station B is apparatus that utilizes the rotary movement of the drum D to effect withdrawal of a fabric strip 23 from a supply roll 22 without imparting any stretch to said fabric, said apparatus also supporting said withdrawn fabric and guiding it onto said drum. Said apparatus comprises a tray that is generally designated 74, said tray comprising a rectangular frame 75 and a sheet metal top 76. Journal brackets 77, 77 are mounted upon each side of the tray frame at the end thereof nearest the turret 16, said brackets supporting a rotatably mounted shaft 78 that carries a roller 79 between said brackets. At the opposite end of the tray, adjacent the drum D, the opposite sides of the tray frame are provided with projecting brackets 80, 80 in the outer ends of which is journaled a relatively small guide roller 81. Inwardly of roller 81 a shaft 82 is journaled in brackets 80, and a larger roller 83 is mounted upon said shaft between said brackets. The roller 83 has a surface of resilient material, such as soft rubber composition, and it rests upon the perimeter of drum D in the operative position of the tray so as to be frictionally driven by said drum. The roller 81 at such time is disposed in spaced relation to the drum, as shown in Figures 6 and 9.

The shaft 78 projects from one side of the tray frame 75, and loosely journaled upon said projecting portion, in spaced apart relation, are respective sprockets 85, 86, the adjacent faces of the hubs of said sprockets being formed with clutch elements or teeth that are adapted to be engaged alternatively by a clutch member 87 (Figures 4 and 8), that is slidably keyed to shaft 78, between said sprockets. The clutch member 87 is engaged by the forked end of a shipper lever 88 that is pivotal'y mounted at 89 upon a bracket 90 that is secured to tray frame 75. Laterally of its pivot, the shipper lever is arcuately formed at 91 for engagement with a spring pressed member carried by an operating lever 92 that is pivoted at 93 on the bracket 90. The arrangement is such that in one position of the lever 92 the shipper lever 88 moves the clutch member 87 into engagement with sprocket 86, and in the other position of lever 92 the said clutch member engages sprocket 85.

The sprocket 85 is connected by sprocket chain 94 with a sprocket 95 mounted on the projecting end of shaft 82. Mounted beside the latter is a stub shaft 96 upon which is journaled a sprocket 97 that is connected by sprocket chain 98 with sprocket 86. The hub of sprocket 97 is formed with a gear 99 that is meshed with a gear 100 mounted upon shaft 82. It will be seen that sprocket chains 94, 98 always move in opposite directions. Since the direction of rotation of the drum D is reversed, upon occasion, the provision of the clutch 87 make it possible at all times to drive the roller 79 in the proper direction to withdraw fabric from a supply roll 22 as presently will be explained.

For guiding fabric accurately across the tray 74 to the drum D, the top of the tray is provided with upstanding guide plates 102, 102 that are positioned to engage the respective lateral margins of a strip 23 on said tray. Said guide plates are mounted upon respective supporting blocks 104 that extend through a slot 105 that extends transversely of the tray top 76, said blocks being slidably mounted upon a guide rod 106 disposed below slot 105 and supported in frame 75. Lateral adjustment of blocks 104 is effected by levers and links that are substantially identical with those employed for a similar purpose on tray 49 hereinbefore described, so that further description thereof is unnecessary. The hand lever by means of which the guides 102 are concurrently adjusted is designated 107.

The tray 74 is pivotally mounted at 108 substantially midway between its ends upon a bracket 109 that is mounted upon the upper end of a post 110, the latter extending downwardly through a supporting bracket 111 and being keyed therein against rotation. The post 110 is arranged for vertical movement in the bracket 111, and has its middle portion threaded at 112 and has a nut 113 in the form of a handwheel mounted on said threaded portion and resting upon the top of said bracket. The arrangement is such that rotation of the nut 113 will raise or lower the post 110 and, tray 74.

The tray 74 is arranged to be tilted or oscillated about its pivot 108 by means of a push rod 115 that is pivotally connected to the under side of frame 75 at 116, between the pivot 108 and the roller 79. The lower end of push rod 115 is pivotally connected to one end of a foot-lever 117 that is fulcrumed at 118, intermediate its respective ends, upon a bracket 119 that is adjustably mounted upon the lower end of post 110. An adjustable stop 120 is mounted upon the base of bracket 111 below the lower end of push rod 115. The arrangement is such that the tray 74 and foot-lever 117 may be adjusted as to position in conformity with the different sizes of drums D employed.

The tray 74 in its inoperative position normally assumes the position shown in broken lines in Figure 1. When tilted or oscillated to the operative position shown in full lines in said figure, the roller 83 rests upon the surface of drum D and the roller 79 engages the bight 27 formed in the outermost convolution of liner and fabric on the supply roll 22 that at such time is at the work delivery station. In pressing against the bight 27, the roller 79 forces the supply roll 22 rearwardly to operative position against the tension of springs 41, and thus disengages the teeth 37 of the supply roll shell from the dogs 39, whereby said supply roll is put in condition to be rotated.

Figure 4:
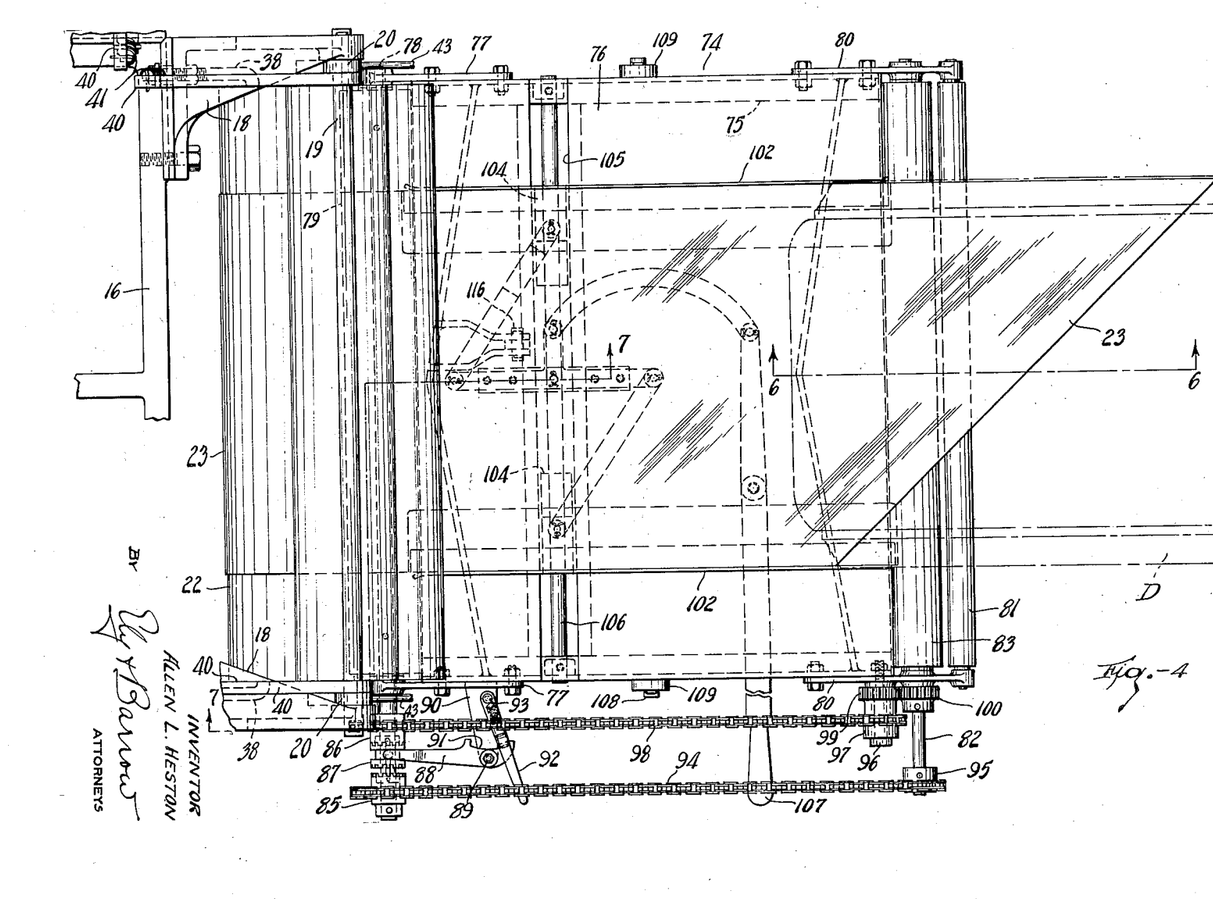
Figure 4 is a plan view of the work delivery end of the apparatus, on a larger scale, as indicated by the line 4—4 of Figure 1.

The bight 27 becomes sufficiently slack after the supply roll is disengaged from dogs 39 that the roller 79 presses into said bight as shown, whereby the bight contacts the roller throughout a substantial area of its surface and good driving engagement between the fabric and roller is assured. Now if the drum D is rotated in the direction indicated by the arrows in Figures 1, 5 and 6 respectively, the roller 79 will be driven in clockwise direction as shown in Figures 4 and 7 provided the clutch 87 is in the position shown in Figures 4 and 8, with the result that the supply roll 22 will be driven in counter clockwise direction to feed the fabric strip 23 therefrom, the liner 24 being automatically wound upon the rewind roller 29 by the torque of the spring 34 therein. Fabric fed from supply roll 22 is carried lengthwise of the tray 74, passing over guide roller 81, and is drawn onto drum D by rotation of the latter. During this operation the fabric is out of contact with roller 83 which is being driven in reverse direction by the said drum, as is best shown in Figure 6. Since the fabric 23 in the bight 27 is backed by the liner 24, the rotation of roller 79 will not cause any stretching of the fabric at this point. Being supported by the tray 74, the fabric cannot stretch of its own weight between the supply roll and drum. But little pull is required to move the fabric across the tray 74 to the drum; hence there is substantially no stretching of the fabric from this cause.

Upon occasion it is desirable to rotate the drum D in reverse direction as indicated by the arrow in Figure 9. In this case the fabric 23 is brought around guide roller 81 and fed onto the drum under the roller 83. The lever 92, of course, requires to be moved to its alternative position so that clutch 87 engages sprocket 85 whereby the roller 79 is driven in the proper direction to feed the fabric of the supply roll 22.

It is believed that the operation of the apparatus will be apparent without further description. The apparatus is relatively simple in its construction and operation; it handles the tire fabric without appreciably stretching the same, and it accomplishes the other objects set out in the foregoing statement of objects.

Figure 10:
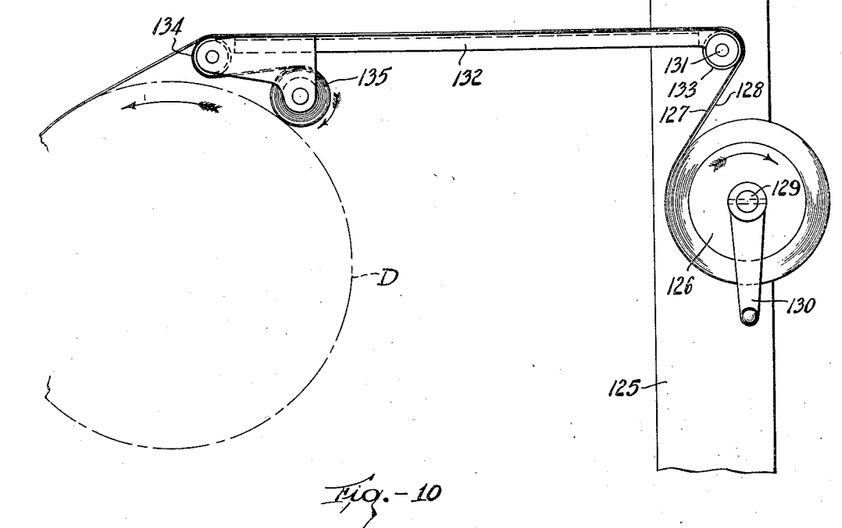
Figure 10 is a side elevation of another embodiment of the invention.

In the embodiment of the invention shown in Figure 10 of the drawings, a fragmentary portion of the turret is shown at 125 therein, and 126 is a supply roll of liner 127 and tire building fabric 128 that is mounted upon a shaft 129 that is journaled in said turret. A hand crank 130 on shaft 129 is provided for manually rotating said shaft and supply roll 126. Pivotally mounted at 131 on the turret is a tray 132 that extends outwardly over a tire building drum D. At the pivoted end of the tray is a roller 133 over which the fabric and liner pass in moving from the supply roll 126 to the top of tray 132, and at the free end of said tray is journaled a roller 134 over which the fabric and liner also pass as the fabric is fed to the drum D. Journaled on the underside of tray 132, adjacent the free end thereof, is a liner rewind roller 135, that, in the operative position of the tray 132 shown in the drawings, rests upon the perimeter of drum D so as to be driven thereby, and holds the free end of the tray at sufficiently elevated position for the roller 134 to clear the drum. The rewind roller 135 winds up the liner 127 after the latter has been drawn across the tray 132 with the tire building fabric 127.

The arrangement is such that the fabric 127 is fed onto the drum D without appreciable tension or stretching. At the work receiving station the fabric is fed onto the supply roll 126 simply by placing the fabric on the liner upon the tray, and turning the hand crank 130 to rotate the supply roll in the proper direction. At intermediate stations the tray 132 may be swung about its pivot 131 to an elevated, inoperative position.

Modification may be resorted to without departing from the spirit of the invention or the scope of the appended claims, which are not limited wholly to the specific construction shown and described.

What is claimed is:

1. In tire building apparatus, the combination of a pair of adjacent parallel rollers, a liner having its ends connected to the respective rollers so as to be wound, in alternation, upon each of them, means for driving one of said rollers to wrap the liner and a strip of material thereon, and means normally urging the other roller to rotation in a direction to rewind the liner thereon.

2. In tire building apparatus, the combination of a pair of parallel rollers, a liner having its ends connected to the respective rollers so as to be wound, in alternation, upon each of them, means for driving one of said rollers to wrap the liner and a strip of material thereon, and means operated by the liner adapted to store up energy as the liner is drawn onto said roller for urging the other roller to rotation in a direction to maintain the liner taut at all times.

3. In tire building apparatus, the combination of a pair of parallel rollers, a liner having its ends connected to the respective rollers so as to be wound, in alteration, upon each of them, means for driving one of said rollers to wrap the liner and a strip of material thereon, and means cooperating with the other roller for storing up energy when it is rotated in one direction, and adapted normally to urge said roller to rotation in the opposite direction for maintaining the liner in taut condition.

4. In tire building apparatus, the combination of a pair of parellel rollers, a liner having its ends connected to the respective rollers so as to be wound, in alternation, upon each of them, and means for driving one of said rollers to wrap a strip of material thereon together with the liner from the other roller, said other roller including a torsion spring adapted to store up energy during the withdrawal of liner from its roller.

5. In tire building apparatus, the combination of a roller for liner and tire building fabric, a roller adjacent thereto to which one end of the said liner is attached, means normally urging said last mentioned roller to rotation in the direction to rewind the liner thereon, and means adapted to engage the first mentioned roller to restrain it against rotation due to pull on the liner.

6. In tire building apparatus, the combination of a roller for liner and tire building fabric, a roller adjacent thereto to which one end of the said liner is attached, means normally urging said last mentioned roller to rotation in the direction to rewind the liner thereon, a movable support in which said rollers are journaled, and means preventing the last mentioned roller from functioning to rewind the liner in one position of said support.

7. In tire building apparatus, the combination of a roller for liner and tire building fabric, a roller adjacent thereto to which one end of said liner is attached, means normally urging said last mentioned roller to rotation in the direction to rewind the liner thereon, a movable support in which said rollers are journaled, and means adapted to engage the first mentioned roller, in one position of the support, to restrain it against rotation due to pull on the liner.

8. In tire building apparatus, the combination of a roller for liner and tire building fabric, a roller adjacent thereto to which one end of said liner is attached, means normally urging said last mentioned roller to rotation in the direction to rewind the liner thereon, a pendulous support in which said rollers are journaled, said support having an operative and an inoperative position, and means preventing said last mentioned roller from functioning to rewind the liner when the support is in its inoperative position.

9. In tire building apparatus, the combination of a roller for liner and tire building fabric, a roller parallel thereto to which one end of said liner is attached, means normally urging said last mentioned roller to rotation in the direction to rewind the liner thereon, a movable support in which said rollers are journaled, said support having an operative and an inoperative position, a circumferential series of teeth formed on one of said rollers, and a stationary dog adapted to engage said teeth in the inoperative position of the support to prevent rewinding of the liner on said rewind roller.

10. A combination as defined in claim 9 including yielding means normally urging said support to inoperative position.

11. In tire building apparatus, the combination of a roller for tire building fabric and liner, a liner rewind roller, a depending support that is pivotally mounted at its upper end and in which said rollers are journaled, and yielding means normally urging said support angularly upon its pivot.

12. In tire building apparatus, the combination of a roller for tire building fabric and liner, a liner rewind roller, a pendulous support in which said rollers are journaled, and movable means carrying said support adapted to carry it between a work-receiving station and a work-delivery station.

13. In tire building apparatus, the combination of a supply roll of liner and tire building fabric positioned adjacent a rotatable tire building form, and means engageable with the said supply roll for effecting rotation thereof at substantially the same surface speed as the form to feed the tire building fabric to the form without appreciably stretching said fabric.

14. In tire building apparatus, the combination of a supply roll of liner and tire building fabric positionable adjacent a rotatable tire building form, and a movable tray engageable with the said supply roll and said form, said tray comprising means for utilizing the rotation of said form to effect rotation of said supply roll at substantially the same surface speed as the form to feed the tire building fabric across the tray to said form without appreciably stretching said fabric.

15. In tire building apparatus, the combination of a supply roll of liner and tire building fabric positionable adjacent a rotatable tire building form, a tiltable tray disposed between the said supply roll and said form, means for tilting said tray into engagement with said supply roll and said form, and means on said tray for transmitting the rotary movement of said form to said supply roll.

16. In tire building apparatus, the combination of a supply roll of liner and tire building fabric positioned adjacent a rotatable tire building form, a tiltable tray disposed between said supply roll and form, means for tilting said tray so that its respective ends engage said supply roll and form, and means on said tray for transmitting forward and reverse movement of the form to the supply roll to cause such rotation of the latter as will feed the tire building fabric to the form.

17. In tire building apparatus, the combination of a supply roll of liner and tire building fabric positionable adjacent a rotatable tire building form, a movable support for said supply roll, yielding means urging said support to a determinate position, a tiltable tray disposed between said supply roll and said form, means for tilting said tray into engagement with said form and said supply roll, and moving the supply roll support against the force of said yielding means, and means on said tray for transmitting the rotary movement of said form to said supply roll.

18. A combination as defined in claim 17 in which the supply roll support is a pendulous support.

19. A combination as defined in claim 17 including means for preventing rotation of the supply roll when the supply roll support is urged to determinate position under the force of said yielding means.

20. In tire building apparatus, the combination of a rotatable turret, a plurality of supply rolls of liner and tire building fabric thereon, a tiltable tray having a fixed situs between the said turret and a tire building form, and past which the supply rolls are movable, and means for tilting said tray to place it in position to support a strip of tire building fabric from one of said supply rolls to the tire building form.

21. In tire building apparatus, the combination of a supply roll of liner and tire building fabric positioned adjacent a rotatable tire building form, a tiltable tray positioned between said supply roll and said form, respective rollers journaled at opposite ends of said tray, driving means interconnecting said rollers whereby rotation of one roller will cause rotation of the other roller, and means for tilting said tray whereby one of the rollers thereon is caused to engage the perimeter of the tire building form and the other roller is caused to engage the supply roll.

22. In tire building apparatus, the combination of a supply roll of tire building material positioned adjacent a rotatable tire building form, a movable tray positioned between said supply roll and said form, respective rollers journaled at opposite ends of said tray, driving connection between said rollers including means whereby rotary movement of one roller in either direction may be transmitted to the other roller to drive it in the opposite direction, and means for moving said tray to cause one of the rollers thereon to engage the tire building form and the other roller to engage the supply roll.

23. A combination as defined in claim 22 including a manually operated clutch in the roller-driving connection.

24. In tire building apparatus, a pivotally mounted tray positioned adjacent a rotatable tire building form and adapted to support tire building material passing from a supply roll thereof to said form, means for effecting vertical adjustment of the fulcrum of said tray to accommodate it to tire building forms of various sizes, and means for tilting the tray on its fulcrum.

25. In tire building apparatus, a tray positioned adjacent a rotatable tire building form and adapted to support and guide tire building material passing onto said form, a pivotal support for said tray intermediate the ends thereof, and means for adjusting the height of said support to accommodate the tray to forms of different diameters.

26. In tire building apparatus, a supply source of tire building material, a tray positioned adjacent a rotatable tire building form and adapted to support and guide tire building material onto said form, and a support on which said tray is pivotally mounted substantially midway between its respective ends, said support having a fixed situs between said form and said supply source of material.

27. In tire building apparatus, a tray positioned adjacent a tire building form and adapted to support and guide tire building material onto said form, a support on which said tray is pivotally mounted, adjustable means for tilting the tray on its pivot, and means for adjusting the height of the tray support to accommodate the tray to forms of different diameters.

28. In tire building apparatus, the combination of a movable supporting structure, a plurality of supply rolls and tire building fabric thereon, a tiltable tray having a fixed situs adjacent said movable support, and past which the supply rolls are moved, and means for tilting said tray to cause one end thereof to engage a supply roll.

29. In tire building apparatus, the combination of a rotatable turret, a plurality of supply rolls of liner and tire building fabric thereon, a tray positioned adjacent said turret and being pivotally mounted at one of its ends, and means for swinging the free end of said tray into engagement with a supply roll on said turret.

30. In tire building apparatus, the combination of a rotatable turret, a plurality of supply rolls of liner and fabric thereon, a tray having a fixed situs adjacent said turret, said tray being pivotally mounted at the end thereof remote from the turret, rollers at the respective ends of the tray, means for driving the roller at the free end of the turret from the pivoted end thereof, and means for moving said tray angularly so as to carry the roller on the free end thereof into engagement with a supply roll on said turret.

31. Tire building apparatus comprising a supply roll of liner and tire building fabric having a bight formed in the outermost convolutions thereon, and means for driving said supply roll through the agency of said bight.

32. Tire building apparatus comprising a supply roll of liner and tire building fabric having a bight formed in the outermost convolutions thereof, and rotatable means adapted frictionally to engage the material in said bight for rotating said supply roll.

33. Tire building apparatus comprising a supply roll of liner and tire building fabric having a bight formed in the outermost convolutions thereof, and a liner rewind roll normally urged to rotation in a direction to rewind liner thereon whereby the material in said bight is maintained in taut condition.

34. In tire building apparatus, the combination of a support for a supply roll of liner and tire building fabric, a pivotally mounted tray carried by said support and positionable adjacent a tire building form, and a liner rewind roll mounted upon said tray relatively remote from the pivot thereof.

35. In tire building apparatus, the combination of a support for a supply roll of liner and tire building fabric, a tray pivotally mounted on said support, means for feeding liner and tire building fabric together to the free end of said tray, and a liner rewind roll carried by said tray adjacent the free end thereof.

36. In tire building apparatus, the combination of a support for a supply roll of liner and tire building fabric, a tray pivoted on said support and having its free end positionable adjacent a rotatable tire building form, a liner rewind roll journaled on the under side of said tray adapted to engage and be driven by said tire building form, and a roller on the free end of the tray about which said liner is drawn as it passes from the supply roll to the liner rewind roll.

ALLEN L. HESTON.